(12) United States Patent
Thota et al.

(10) Patent No.: US 12,167,449 B2
(45) Date of Patent: Dec. 10, 2024

(54) DEVICES, SYSTEMS AND METHODS FOR UTILIZING WIRELESS MEDIUM

(71) Applicant: Cypress Semiconductor Corporation, San Jose, CA (US)

(72) Inventors: Sri Ramya Thota, Bangalore (IN);
Ashok Nimmala, Secunderabad (IN);
Suprojit Mukherjee, Kalyani (IN);
Ayush Sood, Bangalore (IN); Rakshith Ravindra Gore, Mysuru District (IN)

(73) Assignee: Cypress Semiconductor Corporation, San Jose, CA (US)

( * ) Notice: Subject to any disclaimer, the term of this patent is extended or adjusted under 35 U.S.C. 154(b) by 178 days.

(21) Appl. No.: 17/494,507

(22) Filed: Oct. 5, 2021

(65) Prior Publication Data
US 2023/0108231 A1    Apr. 6, 2023

(51) Int. Cl.
*H04W 74/0808*    (2024.01)
*H04W 48/16*    (2009.01)
*H04W 52/24*    (2009.01)
*H04W 84/12*    (2009.01)

(52) U.S. Cl.
CPC ....... *H04W 74/0808* (2013.01); *H04W 48/16* (2013.01); *H04W 52/245* (2013.01); *H04W 84/12* (2013.01)

(58) Field of Classification Search
CPC ............. H04W 74/0808; H04W 48/16; H04W 74/0816; H04W 52/245; H04W 84/12; H04W 52/146; H04W 52/367
USPC ........................................................ 370/329
See application file for complete search history.

(56) References Cited

U.S. PATENT DOCUMENTS

| | | | |
|---|---|---|---|
| 2015/0124704 A1* | 5/2015 | Asterjadhi | H04L 69/24 370/328 |
| 2016/0366637 A1* | 12/2016 | Barriac | H04W 76/10 |
| 2017/0272146 A1* | 9/2017 | Matsuo | H04W 76/14 |
| 2018/0054818 A1* | 2/2018 | Kakani | H04W 72/0446 |
| 2020/0336993 A1* | 10/2020 | Wang | H04W 72/0473 |
| 2022/0007461 A1* | 1/2022 | Mueck | H04W 74/0816 |

* cited by examiner

*Primary Examiner* — Anh M Nguyen
*Assistant Examiner* — Syed M Bokhari

(57) ABSTRACT

A method can include, in a wireless device connected to a first network and configured to transmit over a medium, while a detected packet is being received: determining if the detected packet has a network identification value, the network identification value identifying a network in which wireless devices are connected; when at least the network identification value of the detected packet matches that of the first network, setting a timer value that prevents transmissions on the medium by the wireless device during the duration of the detected packet; and when at least the network identification value of the detected packet does not match that of the first network, dropping the detected packet before it is fully received and not setting the timer value.

15 Claims, 14 Drawing Sheets

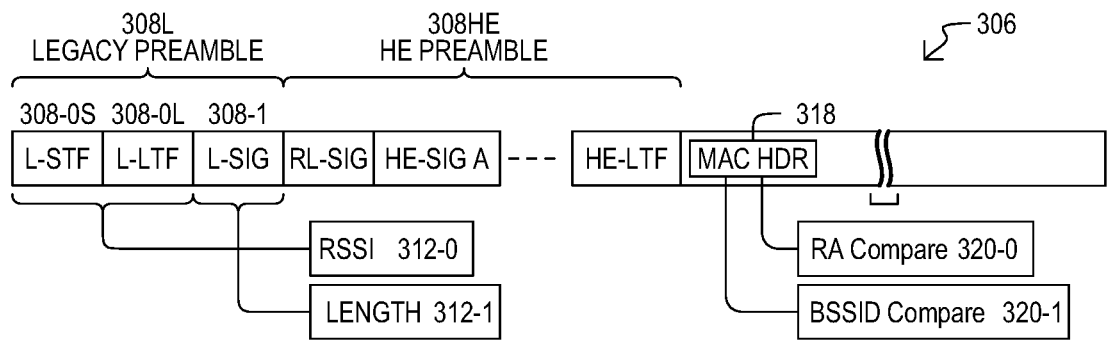
FIG. 3
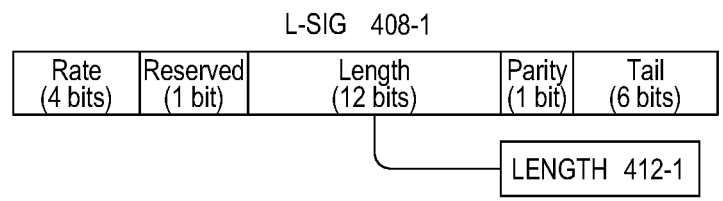
FIG. 4
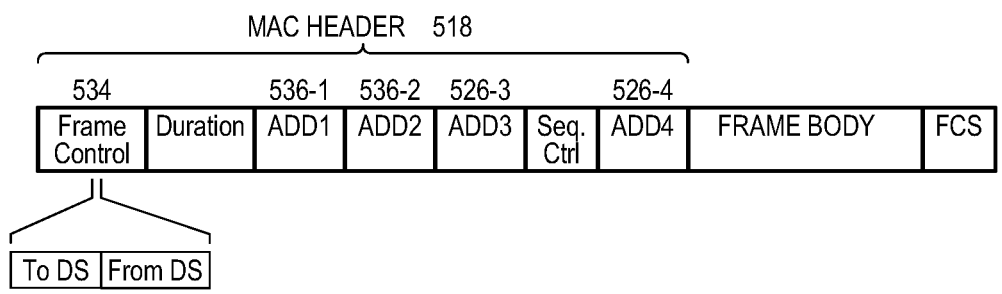
FIG. 5A
FIG. 5B

| Scenario | Average Tx Delay (us) | MY BSS-UDP TX (Mbps) | OBSS-UDP TX (Mbps) |
|---|---|---|---|
| Interference from OBSS traffic in My BSS | 442219 | 4.22 | 28 |
| Interference from OBSS traffic in My BSS (Embodiment enabled) | 19789 | 9.5 | 27 |

FIG. 15

(BACKGROUND)

| Scenario | Average Tx Delay (us) | MY BSS-UDP TX (Mbps) | OBSS-UDP TX (Mbps) |
|---|---|---|---|
| No Interference from OBSS in My BSS | 12267 | 15.1 | 30 |
| Interference from OBSS traffic in My BSS | 442219 | 4.22 | 28 |

FIG. 17B

DEVICES, SYSTEMS AND METHODS FOR UTILIZING WIRELESS MEDIUM

TECHNICAL FIELD

The present disclosure relates generally to wireless networks, and more particularly to accessing a medium in the presence of other, interfering networks.

BACKGROUND

Conventional wireless networks that rely on contention for medium, such as those operating according to various IEEE 802.11 wireless standards, can rely on virtual carrier sensing to control access to the wireless medium. FIG. 16 is a timing diagram showing a conventional virtual carrier sense operation. A device that wishes to transmit (TX) can issue a request-to-send packet (RTS). Such a packet an include information, including a duration (DUR) of the requested transmission. Another device (Non-RX) that is not the target of the transmission can receive the RTS packet. Upon fully processing the packet, including checking the packet integrity with a frame check sequence (FCS), the Non-RX device starts a network allocation vector (NAV) timer, shown as NAV (RTS). The device that is the subject of the transmission (RX), in response to the RTS packet, can return a clear-to-send (CTS) packet. This packet can also be processed by the Non-RX device to generate a NAV (CTS) timer. During the NAV timer, the Non-RX device will not transmit on the medium.

The proliferation of wireless devices, particularly on unlicensed spectra, such as the 2.4 GHz and 5 GHz bands, had led to crowded operating environments in which the transmission of one network (e.g., IEEE 802.11 basic service set (BSS)) can overlap with those of another (e.g., an "other" BSS (OBSS)). Any way of improving the transmission of data in such crowded environments could be of great benefit to wireless networking.

BRIEF DESCRIPTION OF THE DRAWINGS

FIG. 3 is a diagram showing the processing of a packet according to another embodiment.

FIG. 4 is a diagram of a signaling field that can be processed in embodiments.

FIGS. 5A and 5B are diagrams showing MAC header fields that can be processed in embodiments.

FIG. 15 is a table showing results according to an embodiment.

FIG. 17B is a table showing performance of the method shown in FIG. 17A.

DETAILED DESCRIPTION

Figure 17A:
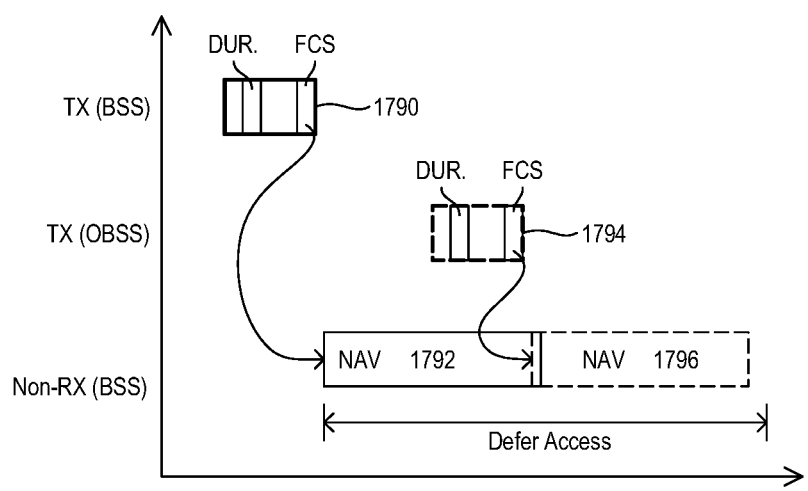
FIG. 17A is a timing diagram showing a method of deferring access in response to detected packets that can be included in embodiments.

FIG. 17A shows a medium sensing operation intended to reduce contention for a wireless medium. In such operations, a station (STA) can monitor a medium, and for every packet that does not match its receive address (RA), regardless of the packet origin (i.e., its own BSS or an OBSS)), the STA can update its NAV timer. While such an approach can help ease network contention by freeing up the medium for other devices, some applications can suffer, as the presence of packets from outside of its BSS can result in transmission delay.

Referring still to FIG. 17A, in the operation shown, a transmitting device of a BSS (TX (BSS)) can transmit an in-network packet 1790. That is, packet 1790 is intended for another device of the same BSS. It is noted that packet 1790 is not necessarily a request-to-send (RTS) packet. In response to packet 1790, a STA of the same BSS, but not the target of the packet (Non-RX(BSS)), can update its NAV timer 1792. Such an operation can beneficially keep the medium free for the BSS as needed. However, the Non-RX device can also detect an out-of-network packet 1794. In response to detecting such a packet, the Non-RX can further update its NAV timer 1796. As a result, the Non-RX device may defer access to the medium for a considerable amount of time, leading to delays in its own transmissions.

FIG. 17B is a table showing performance of a device that updates its NAV timer in response to non-RA packets (i.e., packets that do not have a receive address that matches that of the device) as shown in FIG. 17A. In FIG. 17B, communications are made using modulating and coding set MSC4, with one spatial stream (NSS1), and can transmit an aggregate MAC protocol data unit (AMPDU) with one MPDU, having a length of 300 bytes. Transmissions are made without OBSS traffic as well as with OBSS traffic. OBSS traffic is of considerably larger packet size, with transmissions made at MCS4, NSS1, with 64 MPDUs in an AMPDU having a length of 1500 bytes. As shown, the presence of OBSS traffic can result in substantial increases in transmission delay (Average Tx Delay), as well as transmission data rate (MY BSS-UDP TX).

According to embodiments, a wireless device can monitor a medium for packets, and upon detecting a packet, start receiving the packet. While the packet is being received, the device can perform multiple actions, including determining a network identification value (e.g., BSSID) for the packet. If the network identification value is for the network of the device, a timer value (e.g., NAV) can be set that prevents transmission on the medium. If the network identification value is not for the network of the device, the packet can be dropped before it is fully processed without setting the timer value.

In some embodiments, while the packet is being received, a device can determine a length of the packet from a preamble, and then determine a duration value for the packet from the length value. If the packet is not for the network of the device, the device may transmit one or more outgoing packets during the duration of the (dropped) packet.

In some embodiments, while the packet is being received, a device can determine a receive power for the packet. If the packet is not for the network of the device, the device may then transmit an outgoing packet at a transmit power that varies according to a receive power. In some embodiments, a device can compare a receive power to a minimum and maximum threshold. If the receive power is below the minimum threshold, the transmit power can be at a reference level (which can be a maximum allowable power level). If the receive power is between the minimum and maximum thresholds, the transmit power can be lower than then a reference level.

Figure 1:
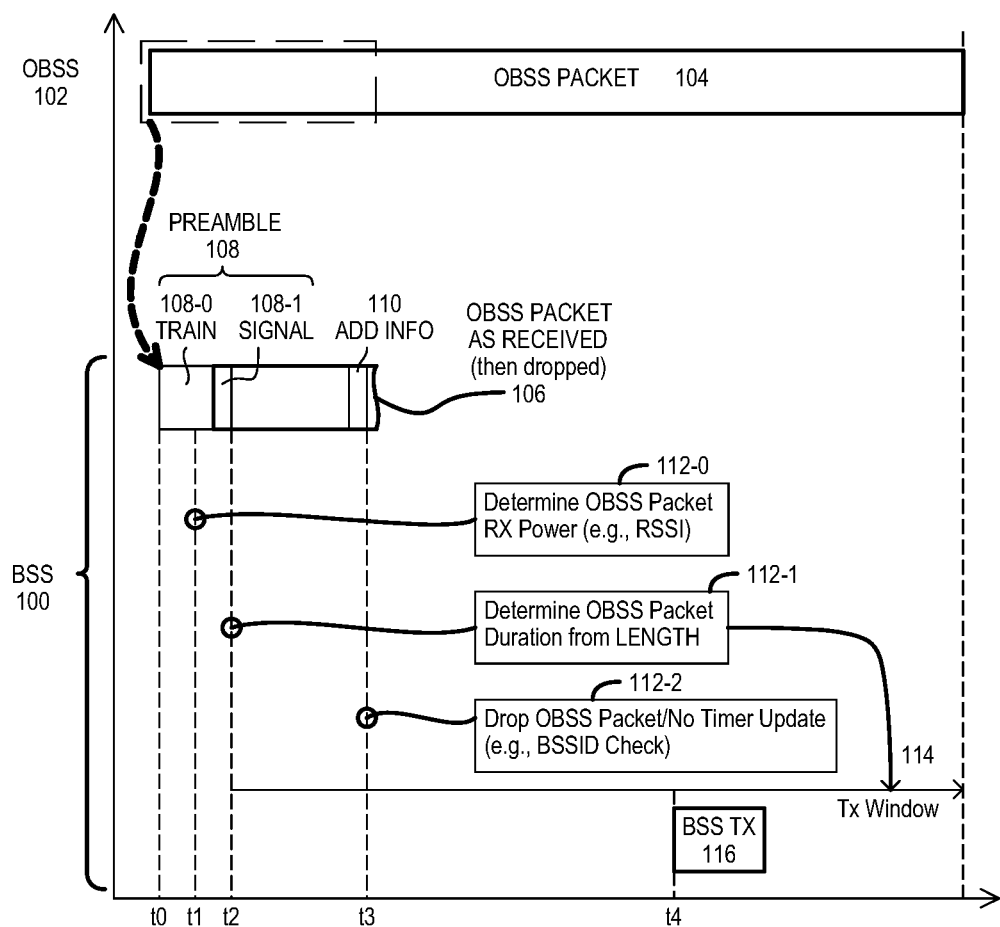
FIG. 1 is a timing diagram showing wireless operations according to an embodiment.

FIG. 1 is a timing diagram showing wireless system operations according to an embodiment. FIG. 1 shows operations of a device 100 belonging to one network (BSS)) in response to transmissions from a device 102 of another network (OBSS). A network can be a collection of wireless devices that can communicate with one another after a predetermined joining procedure. In some embodiments, a network can be a BSS compatible with one or more IEEE 802.11 wireless standards. BSS device 100 can use virtual carrier sense by setting a timer (e.g., NAV) in response to predetermined conditions.

According to embodiments, OBSS device 102 (i.e., an out-of-network device) can transmit a packet (OBSS packet) 104, which can be detected by BSS device 100 (i.e., an in-network device 100).

At time t0, BSS device 100 can start to receive the OBSS packet 104. Receiving a packet can include synchronizing to the wireless signal, deriving bit values from the signal (e.g., demodulation, descrambling), and organizing the bit values in data values (e.g., deframing). While the OBSS packet 106 is being received, BSS device 100 can determine various values from the OBSS packet 106. OBSS packet 106 can begin with a preamble 108 that include one or more training fields 108-0 and one or more signaling fields 108-1. A training field 108-0 can enable signal synchronization and identify a framing of the packet. A signaling field 108-1 can provide preliminary information regarding the packet, including packet length (e.g., number of bytes). OBSS packet 106 can also include addressing information 110, which can indicate a destination and/or receive address, as well as network identification value. A network identification value can distinguish the networks from one another (e.g., BSS from OBSS).

At about time t1, from one or more training fields 108-0, BSS device 100 can determine a receive power 112-0 of the OBSS packet. In some embodiments, a receive power can be expressed by a received signal strength indication (RSSI).

At about time t2, from a length value contained in one or more signaling fields 108-1, BSS device 100 can determine a duration for the OBSS packet. In some embodiments, such an action can include using signaling data from OBSS packet to determine a transmission rate (including adjustments for encoding) or can use a stored value, including an estimated conversion value.

At time t3, while the OBSS packet 106 continues to be received, from address information 110, BSS device 100 can determine if the packet is for its own network. As shown in FIG. 1, if the packet is not for the network of BSS device 100, the packet can be dropped 106, and the virtual carrier sense timer is not affected 112-2. Dropping a packet can include ceasing to process the wireless signal. In contrast, if a packet is for the network of BSS device 100 (but not addressed to BSS device 100), a virtual carrier sense timer can be set, as described for FIGS. 17A. As noted herein, it is understood that such a timer update is for the received packet itself, not a preceding packet (e.g., RTS or CTS packet). In the event an RTS packet and corresponding CTS packet were previously detected and received, a NAV timer may or may not be updated depending upon the reception of a following data packet.

According to embodiments, having dropped an out-of-network packet 104, a BSS device 100 can use the duration of the OBSS packet 104 as a transmit window 114. A transmit window 114 can correspond to the duration determined from OBSS packet length. BSS 100 can transmit one or more outgoing packets (one shown as 116 at time t4) in the transmit window 114. A transmit power of outgoing packet 116 can be adjusted in response to receive power value determined at 112-0.

Figure 2A:
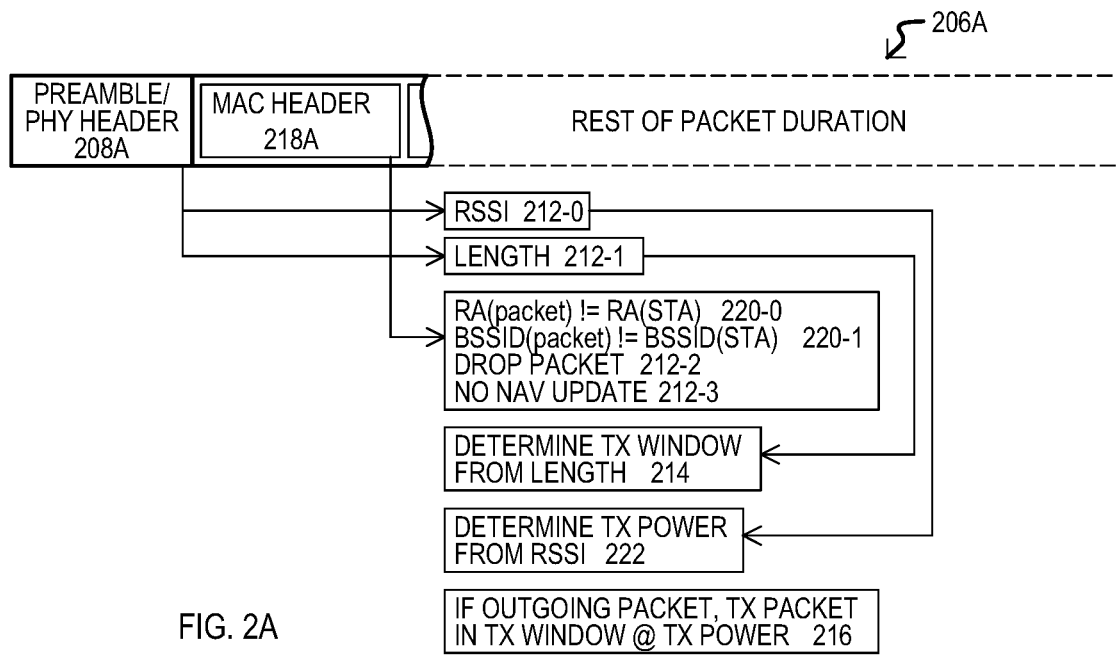
FIGS. 2A to 2C are diagrams showing the processing of IEEE 802.11 compatible packets according to embodiments.
Figure 2B:
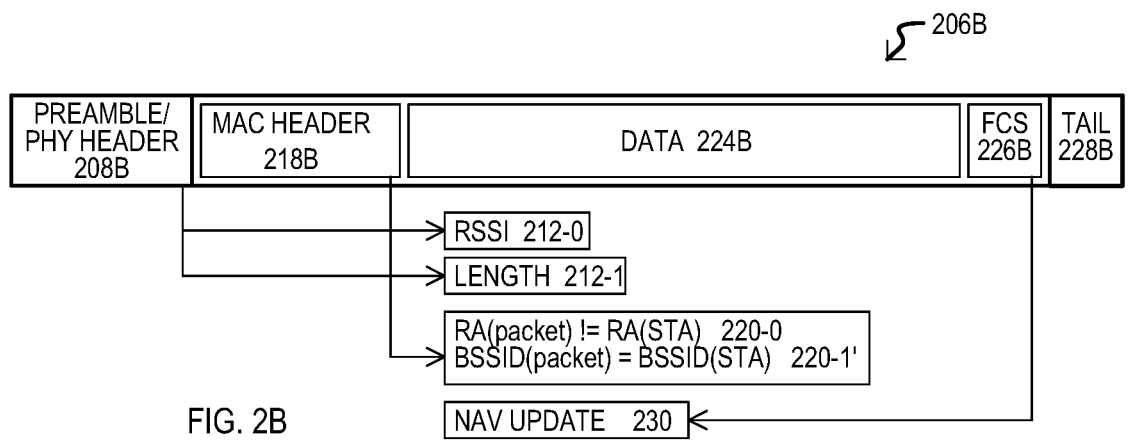
Figure 2C:
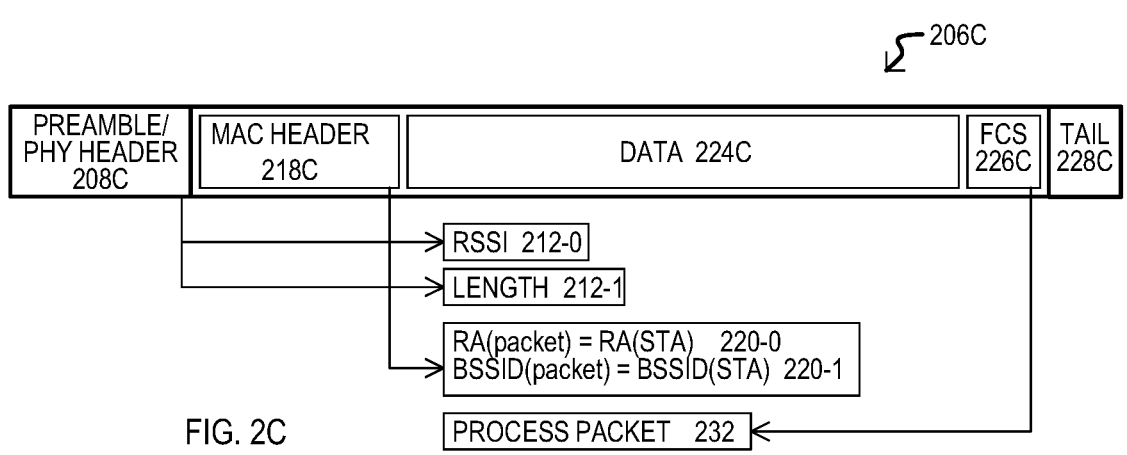

FIGS. 2A to 2C are diagrams showing packet processing of different packet types by a device according to embodiments. The packets of FIGS. 2A to 2C are compatible with an IEEE 802.11 wireless standard.

FIG. 2A shows a processing of an out-of-network packet that results in the packet begin dropped, but no update to a NAV timer. As a packet 206A is received, from a preamble and physical layer (PHY) header 208A, a device can determine an RSSI 212-0 and a packet length 212-1. From a MAC header 218A, a device can compare a receive address (RA) of the packet to its own address 220-0. Similarly, from a field in MAC header 218A, the device can compare a BSSID to that of its own BSS 220-1. In the case of FIG. 2A, the values do not match. Because the values do not match, the packet can be dropped 212-2. Because the packet is dropped there is no NAV update for the device 212-3. In some embodiments, dropping the packet before the processing of a frame check sequence (FCS) can result in no NAV update. According to embodiments, dropped packet 206A has not been preceded by corresponding RTS and CTS packets.

From the length value, a device can determine a transmission window 214. A transmission window can correspond to a duration of the packet 206A. From the RSSI value, a device can determine a potential transmit power 222. If the device has data for transmission, the device can transmit an outgoing packet that fits within the transmission window at the determined transmission power 216.

FIG. 2B shows a processing of an in-network packet that results in the device updating its NAV timer. As a packet 206B is received, a device can determine RSSI and length as noted in FIG. 2A. Unlike FIG. 2A, when a MAC header is processed, while a receive address (RA) does not match the device address 220-0, a BSSID does match that of the device 220-1. Because the BSSID matches, once the packet has been received (e.g., checked with an FCS), a NAV timer of the device can be updated (as noted in FIG. 17A, for example).

FIG. 2C shows a processing of a packet that matches the RA of the device. As a packet 206C is received. Such processing can be essentially conventional for the packet.

FIG. 3 is a diagram showing packet processing according to another embodiment. A received packet 306 can be a packet compatible with an IEEE 802.11 high-efficiency (HE) wireless standard. A received packet 306 can include a legacy preamble 308L, HE preamble 308HE, and MAC header 318. A legacy preamble 308L can include a legacy short training field (L-STF) 308-0S, a legacy long training field (L-LTF) 308-0L, and a legacy signaling field (L-SIG) 308-1. A device can determine an RSSI 312-0 from an L-STF and/or L-LTF, and can determine a length value from L-SIG. As noted herein, fields of a MAC header 318 can be used to compare a packet RA value to a device's RA value 320-0, and a packet BSSID value to the device's network BSSID 320-1. It is understood that FIG. 3 shows but one possible example, and field names and locations should not be construed as limiting. As but one of many examples, a packet compatible the IEEE 802.11a standard may include a signal field (SIG) with a length value (i.e., not a legacy field).

FIG. 4 is a diagram showing a processing of an L-SIG 408-1 field according to an embodiment. L-SIG 408-1 can include a length field from which a packet duration (i.e., transmit window) can be determined. Such a determination can take into account a bit transmission rate (e.g., 6 Mbps), bits per symbol (e.g., 24-bits per symbol), and any additional bits that may be included (e.g., service bits, tail bits).

FIGS. 5A and 5B show MAC header fields that can be processed according to embodiments. FIG. 5A shows an example of a MAC header 518. A MAC header 518 can include a frame control field 534, a duration field, first address field (ADD1) 536-1, second address field (ADD2) 536-2, third address field (ADD3) 536-3, and fourth address field (ADD4) 536-4.

FIG. 5B shows how various address fields can include a receive address (RA) and/or BSSID value depending upon bits of a frame control field 534. According to embodiments, a device can use packet format indicators to extract RA and BSSID values for comparison to decide whether to drop the packet (no match), update a NAV counter (no RA match but BSSID match), or process the packet (BSSID and RA match). It is understood that FIGS. 5A and 5B are provided as particular embodiments, alternate embodiments may have network identifiers and receive addresses at different locations of a packet.

Figure 6:
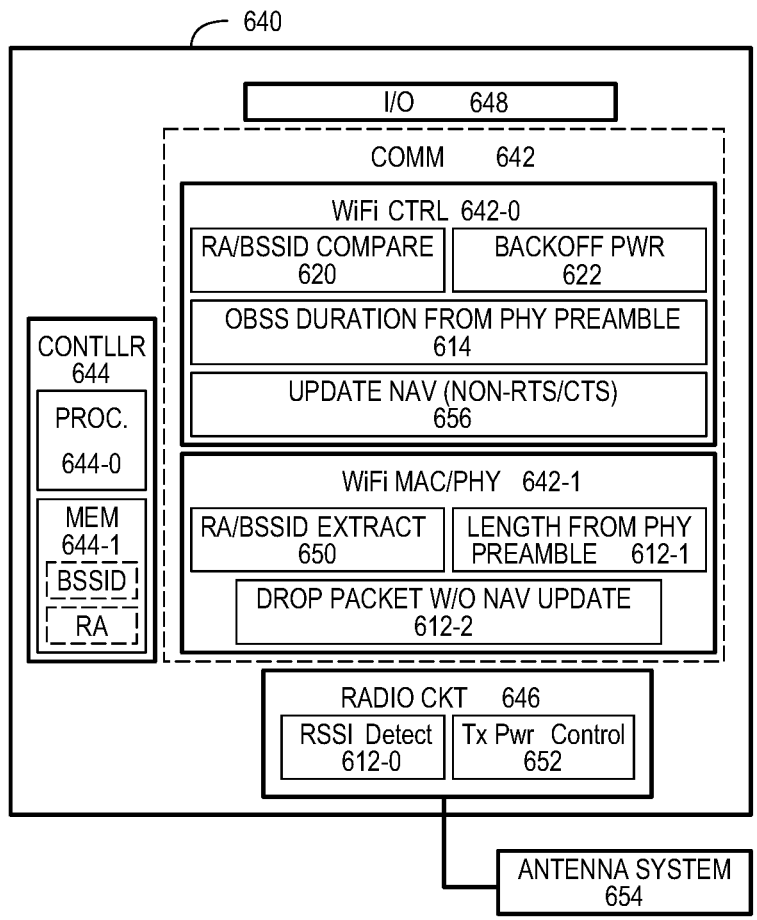
FIG. 6 is a block diagram of a device according to an embodiment.

FIG. 6 is a block diagram of a device 640 according to embodiment. A device 640 can include communication circuits 642, a controller 644, radio circuits 646, and input/output (I/O) circuits 648. Communication circuits 642 can include WiFi control circuits 642-0 and WiFi MAC/PHY circuits 642-1. WiFi control circuits 642-0 can execute communication operations compatible with one or more IEEE 802.11 wireless standards. This can include packet processing operations as described herein and equivalents. In some embodiments, WiFi control circuits 642-0 can compare RA and BSSID values extracted from packets to those stored for device 640. Such circuits can also determine a backoff power value 622. A backoff power can be a reduction in TX power according to an RSSI of out-of-network packet.

WiFi control circuits 642-0 can determine a duration for the out-of-network packet (OBSS) from a physical layer preamble of the packet 614. An OBSS duration can correspond to a duration of a received packet. However, unlike some conventional processing, where a duration value is determined from a MAC header field, a duration value is generated based on a length value (e.g., number of bytes) present in a 30) preamble. Further, an OBSS duration is the duration of the packet being received, but not the duration of a preceding packet like a RTS or CTS packet. As understood from descriptions herein, an OBSS duration can be the same as, or correspond to, a transmit window for the device, in which an outgoing packet can be transmitted. WiFi control circuits 642-0 can also update a NAV timer in response to in-network packets that are not RTS or CTS packets 656 and that were not preceded by corresponding RTS and CTS packets. In some embodiments, such circuits can operate as described in FIG. 17A.

WiFi MAC/PHY circuits 642-1 can control data transmission and reception according to one or more IEEE 802.11 wireless standards. According to embodiments, WiFi MAC/PHY circuits 642-1 can extract RA and BSSID values from received packets. Such actions can include any of those described herein, or equivalents, including reading such data from predetermined fields of a MAC header based on frame type. WiFi MAC/PHY circuits 642-1 can extract a length value from physical layer preamble of a received packet 612-1. As a result, a length value can be determined early in the packet reception process and forwarded to enable the OBSS duration to be determined (i.e., 614). WiFi MAC/PHY circuits 612-1 can also automatically execute a packet dropping function that can cease reception of the packet without updating a NAV counter 612-2. In some embodiments, such circuits can cease packet reception prior to an FCS field, thus not triggering a NAV update. In some embodiments, such an action can be initiated with a software primitive that can reset a clear channel assessment (CCA) operation (e.g., "resetCCA"). WiFi MAC/PHY circuits 612-1 can process RTS/CTS pairs in a conventional fashion, updating a NAV timer for an OBSS data packet that follows the RTS and CTS packets.

A controller 644 can control operations of communication circuits 642. In some embodiments, a controller 644 can include circuits (or instructions executable by circuits) for controlling wireless transmissions according to other processes (e.g., applications). In the embodiment shown, a controller 644 can include a processor section 644-0 and a memory section 644-1. In some embodiments, a memory section 644-1 can store RA and BSSID values for the device for comparison with detected packets.

Radio circuits 646 can include circuits for receiving and transmitting signals according to one or more IEEE 802.11 wireless standards. Radio circuits 646 can include any suitable circuits according to a selected protocol, and in some embodiments can include baseband circuits. In some embodiments, radio circuits 646 can transmit/receive on any internationally recognized industrial, scientific, or medical (ISM) band, as well as portions of such bands. In some embodiments, radio circuits 646 can operate in any or all of 2.4 GHZ, 5 GHz or 6 GHz bands. Radio circuits 646 can include receive power (RSSI) detection circuits 612-0, which can determine the power of a received packet and express it as an RSSI value. In some embodiments, RSSI detection circuits 612-0 can sense a receive power from training fields of a received packet. Radio circuits 646 can also include transmit power control circuits 652, which can control the power of transmitted outgoing packets, including transmitting packets at a backoff power as determined by 622.

I/O circuits 648 can enable control of device 640 by another system or device. I/O circuits 648 can include circuits that enable communication with the device according to any suitable method, including any of various serial data communication standards/methods including but not limited to: serial digital interface (SDI), universal serial bus (USB), universal asynchronous receiver transmitter (UART), I²C, or I²S.

When included as part of a system, device 640 can include one or more antenna systems 654 connected to radio circuits 646. Antenna system 654 can include antennas for receiving and transmitting compatible with one or more IEEE 802.11 wireless standards.

Figure 7:
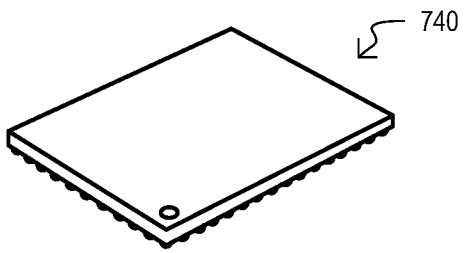
FIG. 7 is a diagram of an integrated circuit device according to an embodiment.

While embodiments can include systems with various interconnected components, embodiments can also include unitary devices which can provide for efficient use of a medium by transmitting within the duration of a detected out-of-network packet, as described herein and equivalents. In some embodiments, such unitary devices can be advantageously compact single integrated circuits (i.e., chips). FIG. 7 shows one particular example of a packaged single chip device 740. Device 740 can include circuits like those shown in FIG. 6, or equivalents. However, it is understood that a device according to embodiments can include any other suitable integrated circuit packaging type, as well as direct bonding of a device chip onto a circuit board or substrate.

Figure 8:
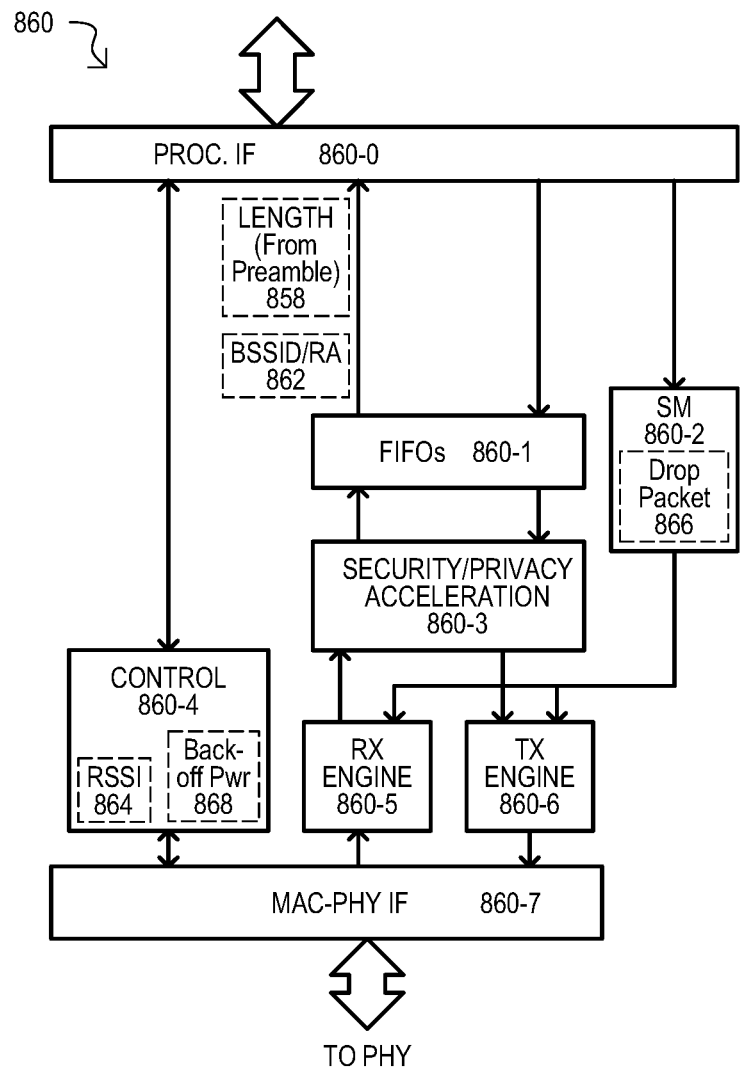
FIG. 8 is a block diagram of MAC circuits and operations according to an embodiment.

FIG. 8 is a block diagram of MAC layer circuits 860 and operations according to embodiments. MAC layer circuits 860 can include a processor interface (IF) 860-0, FIFOS 860-1, state machine 860-2, acceleration circuits 860-3, control circuits 860-4, a receive (RX) engine 860-5, and a transmit (TX) engine 860-6. A processor IF 860-0 can receive data from and/or send data to a processor system or other controller circuit. FIFOs 860-1 can include an output FIFO for receiving output data for transmission in and outgoing packet, as well as an input FIFO for forwarding data from a received packet. Acceleration circuits 860-3 can include circuits specialized to accelerate security/privacy functions (e.g., encryption, decryption, authentication). A TX engine 860-6 can transfer data in a predetermined format for packetization and transmission via MAC-PHY IF 860-7. An RX engine 860-5 can organize and forward data received from MAC-PHY IF 860-7.

State machine 860-2 can control operations of TX and RX engines 860-5/6. In some embodiments, state machine 860-2 can be controlled and/or modified with inputs from a processor circuit via processor IF 860-0. Control circuits 860-4 can enable control PHY circuits (not shown) via MAC-PHY IF 860-7. In some embodiments, control circuits 860-4 can provide information from PHY circuits to processor IF 860-0. In some embodiments, control circuits 860-4 can include registers that can be programmed with configuration data and/or data read to obtain information on received data/signals.

Referring still to FIG. 8, according to embodiments, MAC layer circuits 860 can provide length value 858, BSSID and RA values 862 to processor IF 860-0. In some embodiments, length value 858 and BSSID/RA values 862 can be provided by selecting from data output from FIFOs 860-1. However, alternate embodiments can include any other suitable circuits for providing such values, including registers that are loaded with such values. Control circuits 860-4 can receive RSSI values 864 and forward them to processor IF 860-0. From the RSSI value, a back-off transmit power can be determined. This value 868 can be provided to physical layer circuits to control a transmit power of outgoing packets. According to embodiments, a state machine 860-2 can execute a drop packet operation 866 in response to inputs from a controller (e.g., processor executing resetCCA).

Figure 9:
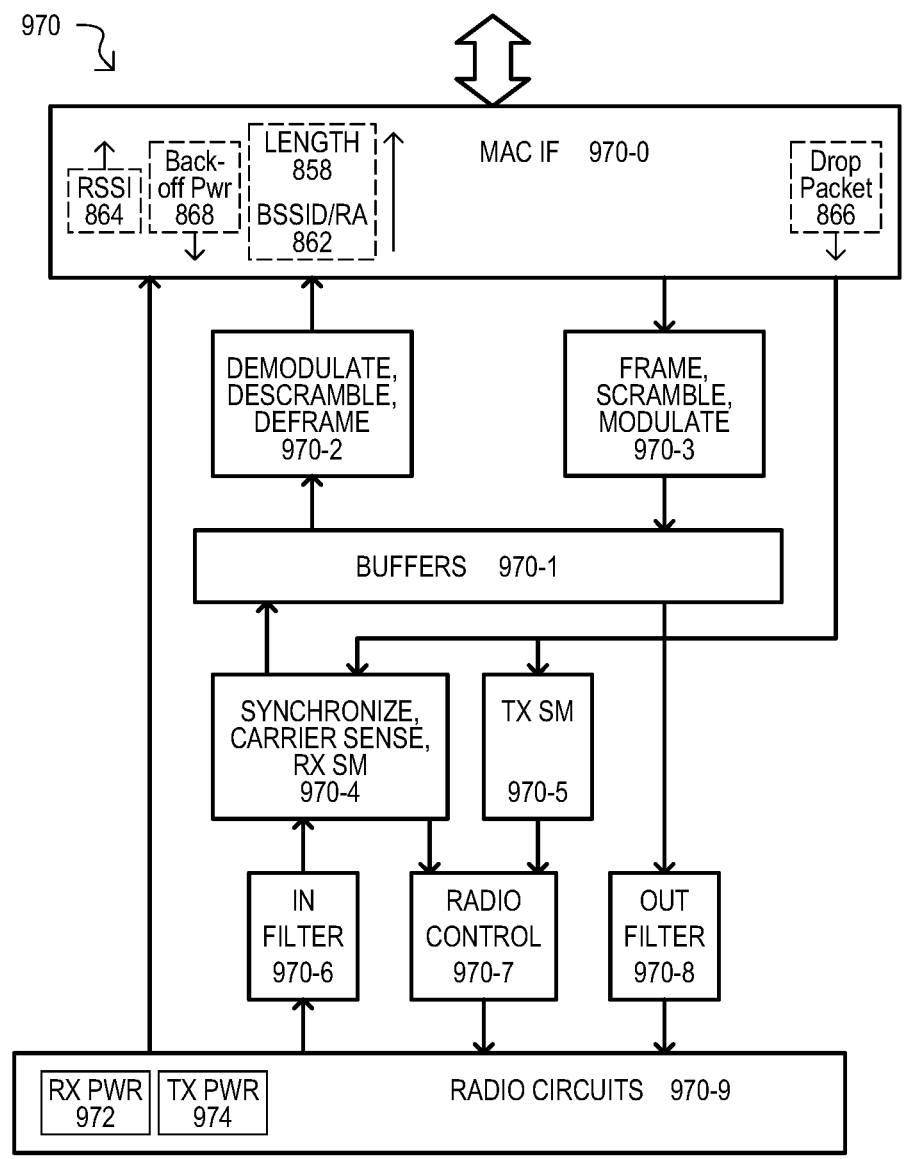
FIG. 9 is a block diagram of PHY circuits and operations according to embodiments.

FIG. 9 is a block diagram of PHY circuits 970 and operations according to embodiments. PHY circuits 970 can include a MAC IF 970-0, PHY buffers 970-1, deframing circuits 970-2, framing circuits 970-3, PHY RX state machine 970-4, PHY TX state machine 970-5, input filter circuits 970-6, radio control circuits 970-7, output filter circuits 970-8, and radio circuits 970-9. MAC IF 970-0 can interface with MAC circuits to receive data for transmission and provide data from received transmissions. PHY buffers 970-1 can buffer input and output data for transmissions. Deframing circuits 970-2 can extract data from received data frames and can perform additional functions including demodulating and descrambling received data. Framing circuits 970-3 can organize output data for transmission in specified data frame format. Framing circuits 970-3 can perform additional functions, including scrambling and modulating data values. PHY RX state machine 970-4 can process signals generated by radio circuits 970-9 and can include synchronization and carrier sense functions. A PHY TX state machine 970-5 can control output transmissions. Input filter circuits 970-6 can include digital filter circuits for filtering input signals. Radio control circuits 970-7 can control operations of radio circuits 970-8 to transmit data frames and receive data frames. Output filter circuits 970-8 can control filtering of output signals.

According to embodiments, PHY circuits 970 can be configured to generate an RSSI value 864 from a received signal, as well as extract a length value 858 from a preamble of a received packet. In some embodiments, received packet data can be filtered (970-6), processed by a state machine (970-4), buffered in PHY buffer 970-1, and processed by deframing circuits 970-2. Such data can include a length value 858 present in a preamble, and BSSID/RA values 862 present in a MAC header. According to embodiments, PHY circuits 970 can execute a packet drop function in response to a drop packet input 866. In some embodiments, a drop packet input can be generated from a command or the like (e.g., resetCCA).

Radio circuits 970-9 can include receive power circuits 972 and transmit power circuits 974. Receive power circuits 972 can generate a RSSI value from a received packet. Transmit power circuits 974 can establish power of an out-going packet, including in response to a back-off power value 868.

While the operations and devices disclosed show various methods according to embodiments, additional methods will now be described with reference to a number of flow diagrams.

Figure 10:
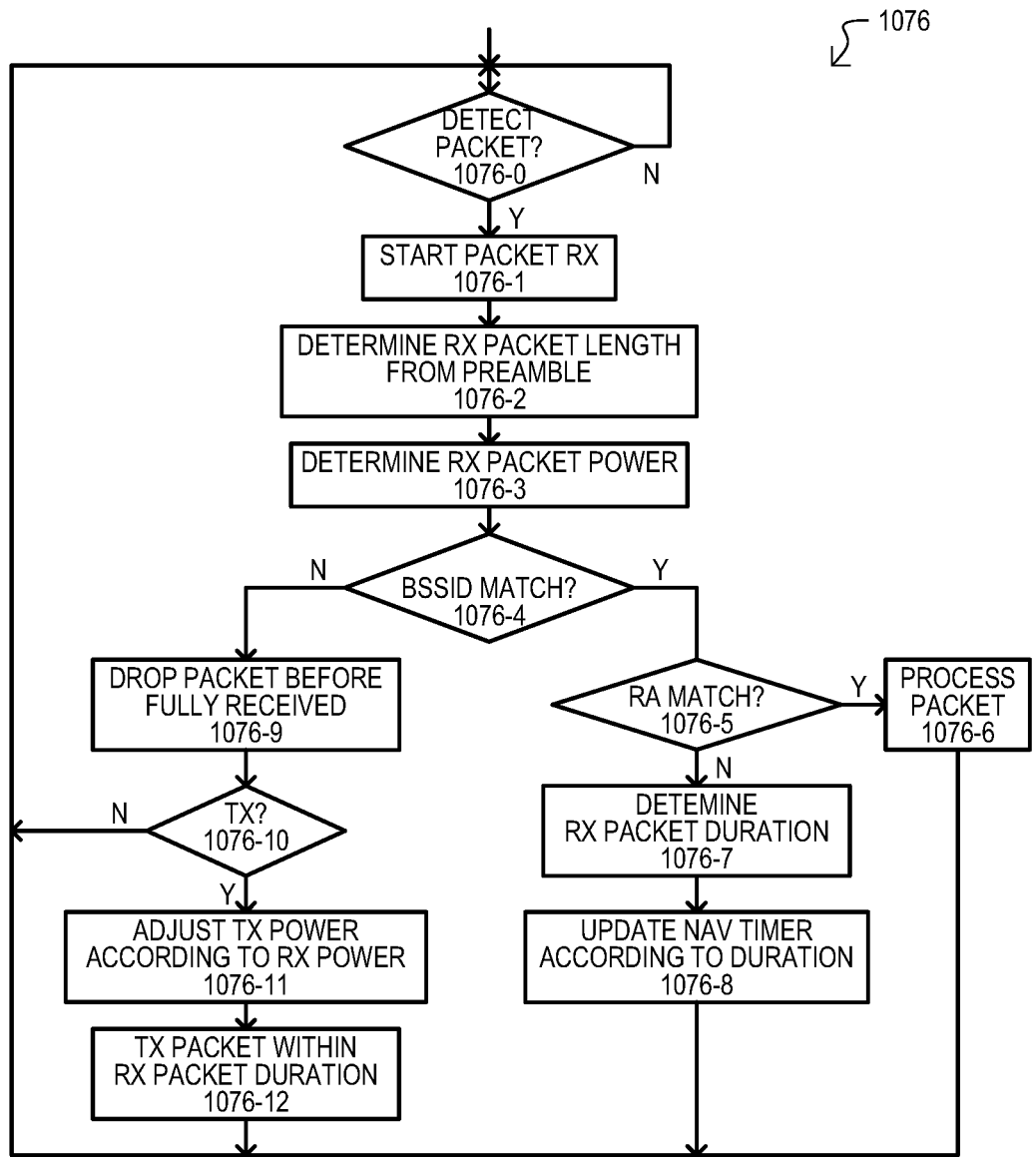
FIG. 10 is a flow diagram of a method according to an embodiment.

FIG. 10 is a flow diagram of a method 1076 according to an embodiment. A method 1076 can be executed by a device (e.g., STA) to make more efficient use of a transmission medium subject to interference from other networks. A method 1076 can include detecting a packet 1076-0. Such an action can include physical carrier sense of transmissions according to any suitable techniques. Upon detecting a packet (Y from 1076-0) a method 1076 can start receiving a packet 1076-1. A length of the packet can be determined from preamble of the packet 1076-2 as well as a receive power 1076-3.

From packet data, method 1076 can determine if the received packet is directed to the network of the device (BSSID match) 1076-4. If the received packet is for the same network (Y from 1076-4), the method 1076 can determine if there is a receive address match 1076-5. If the receive address is for the packet is for the device (Y from 1076-5), the packet can be processed 1076-6. Such an action can include conventional processing of a packet by the device. If the receive address for the packet is not for the device (N from 1076-5), a method 1076 can determine a duration of the received packet 1076-7. While such an action can include using a length value and transmission rate, in other embodiments such an action can include using a duration field of the packet, such as that present in MAC header, as but one example. A NAV timer can then be updated according to the duration 1076-8.

If the received packet is not for the same network (N from 1076-4), a method 1076 can drop the packet before it is fully received 1076-9. Once the received packet has been dropped, a method 1076 determine if the device has data for transmission 1076-10. If there is data for transmission (Y from 1076-10), a method can adjust a transmission power according to a received power 1076-11. A device can then transmit a packet within the remaining duration of the received packet 1076-12.

Figure 11A:
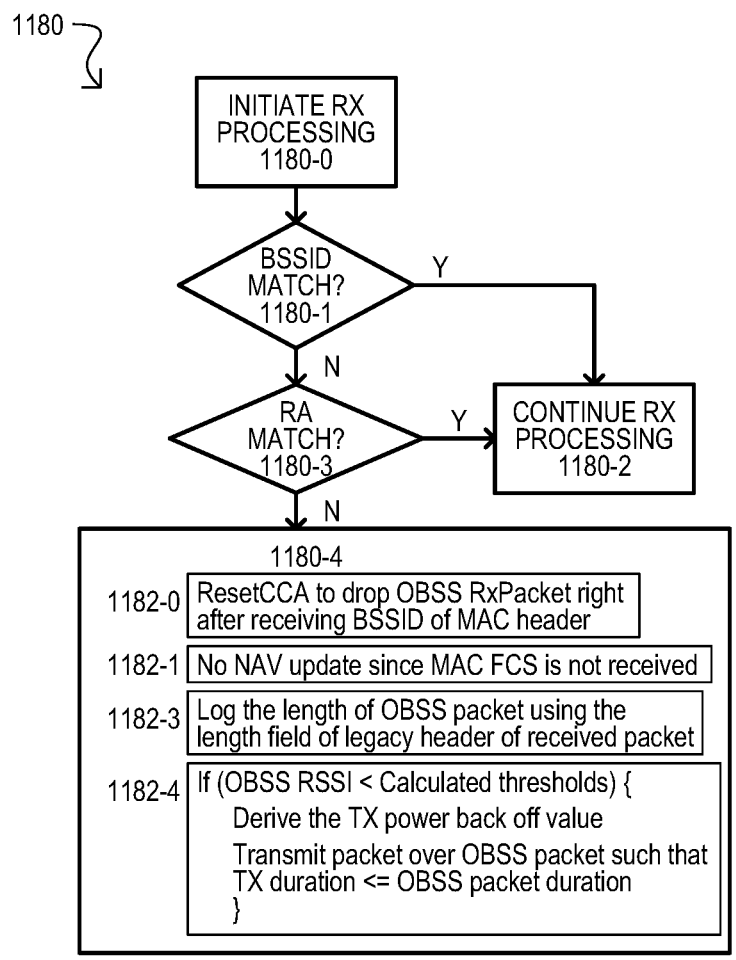
FIGS. 11A and 11B are a flow diagram of packet processing methods according to embodiments.

FIG. 11A is a method 1180 of receiving a packet according to another embodiment. A method 1180 can include initiating receive processing of the packet 1180-0. If there is a BSSID match (Y from 1180-1), a method 1180 can continue receive processing 1180-2. Such an action can include updating a NAV timer if there is no receive address match. If there is no BSSID match (N from 1180-1), a method 1180 can determine if there is a receive address match 1180-3. If there is an RA match (Y from 1180-3), receive processing can continue. Such an action can include conventional processing of a received packet.

If there is not a receive address match (N from 1180-3), a method 1180 can transmit a packet during the received packet 1180-4. Such an action can include dropping the packet after receiving a BSSID of a MAC header 1182-0, which can include executing a software primitive "resetCCA" in some embodiments. There can be no NAV update, as the packet can be terminated before reception of the FCS 1182-1. A length of the received packet (e.g., OBSS packet) can be logged using a length field of a legacy header of the received packet 1182-3. A packet can then be transmitted at a power level established according to the RSSI of the received packet 1182-4. In some embodiments, this can include determining if the OBSS of the received packet is within predetermined thresholds. If so, a transmit back off power can be determined. An out-going packet can then be transmitted over (i.e., at the same time as) the OBSS packet within the duration of the OBSS packet.

Figure 11B:
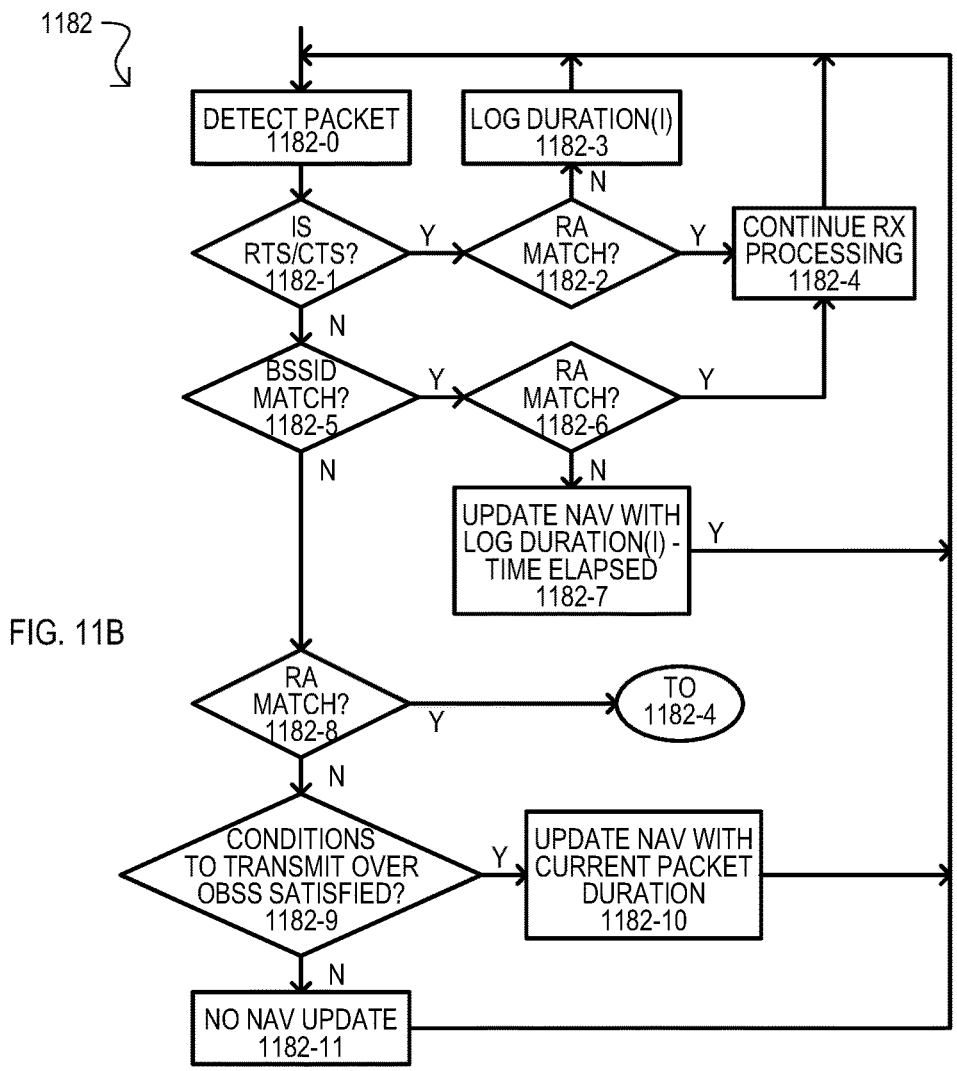

FIG. 11B is a method 1182 of receiving a packet according to another embodiment. A method 1182 can include detecting a packet 1182-0. If the packet is an RTS or CTS packet (Y from 1182-1), a method 1182 can determine if the RTS/CTS packet has a RA that matches the receiving device 1182-2. If there is not a match (N from 1182-3), a duration for the RTS/CTS can be logged 1182-3. If there is an RA match (Y from 1182-2), the packet can continue to be processed 1182-4.

If the detected packet is not an RTS or CTS packet (N from 1182-1), a method 1182 can determine if there is a BSSID packet match 1182-5. If the packet is from the same BSSID as the receiving device (Y from 1182-5), the RA the packet can be examined for a match 1182-6. If there is no match (N from 1182-6), A NAV for the device can be updated with a logged duration less a time elapsed 1182-7. If there is an RA match (Y from 1182-6), the packet can continue to be processed 1182-4.

If the detected packet is not an RTS or CTS packet, and has not BSSID match (N from 1182-5), a method 1182 can check for a RA match 1182-8. If there is a RA match (Y from 1182-8), the packet can continue to be processed. If there is no RA match (N from 1182-8), a method 1182 determine if conditions to transmit over the OBSS are satisfied 1182-9. Such an action can include any of those described herein, or equivalents.

If conditions to transmit over the OBSS are satisfied (Y from 1182-9), a method 1182 can update a NAV with a current (i.e., OBSS packet) duration 1182-10. Such an action can include determining a duration of the OBSS packet according to any of the embodiments described herein, or equivalents. If conditions to transmit over the OBSS are not satisfied (N from 1182-9), a method 1182 may not update a NAV 1182-11.

Figure 12:
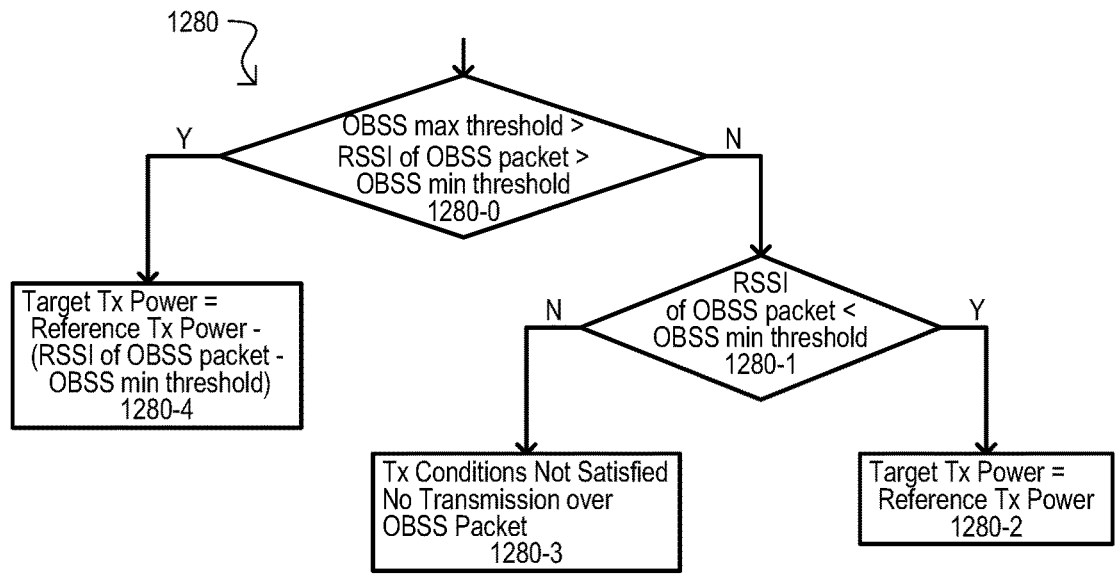
FIG. 12 is a flow diagram of a method for setting a transmit power according to an embodiment.

FIG. 12 is a method 1280 of determining a transmit power for an outgoing packet from a received power of an OBSS packet. A method 1280 can include determining if an RSSI of a OBSS packet is between maximum and minimum threshold values 1280-0. If the RSSI of the OBSS packet is not within the threshold (N from 1208-0), a method 1280 can determine if the RSSI is less than a minimum threshold 1280-1. If the RSSI is less than the minimum threshold (Y from 1280-1), a target transmit power can be set to a reference power 1280-2. In some embodiments, a reference power can be a maximum allowable transmit power for the given system and environment. If the RSSI is not less than the minimum threshold (N from 1280-1), a method 1280 can disable operations to improve use of a medium (e.g., transmitting during an OBSS packet and/or update a NAV counter).

If the RSSI of the OBSS packet is within the threshold (Y from 1208-0), a method 1280 can set a target transmit power to a reference Tx power minus the OBSS minimum threshold 1280-4.

Figure 13:
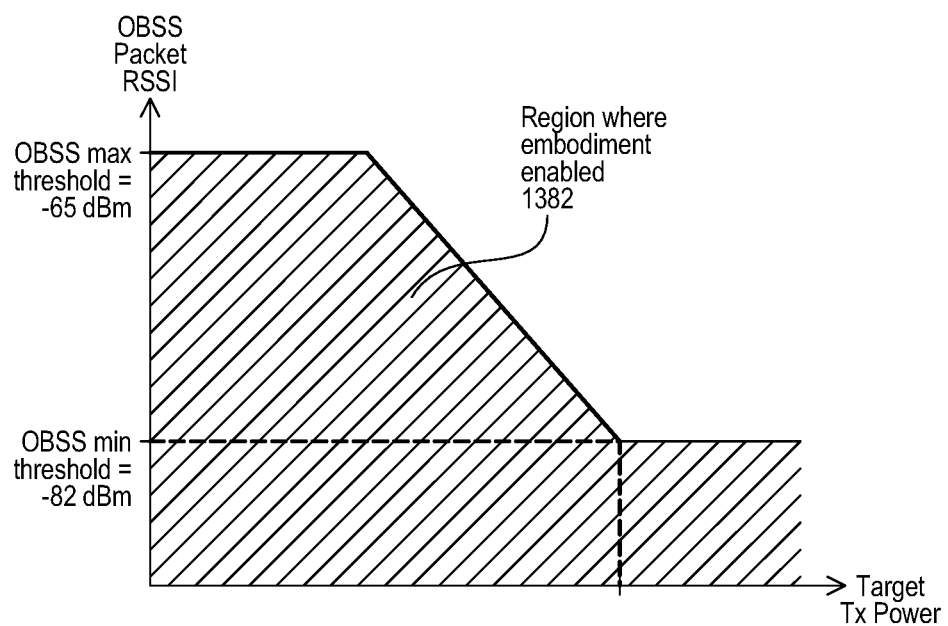
FIG. 13 is a graph showing an received packet power operating region according to an embodiment.

FIG. 13 is a graph showing receive power ranges in which embodiments can adjust a transmit power. The graph shows an OBSS RSSI value versus a target transmit power. FIG. 13 shows an OBSS maximum threshold (OBSS max) and OBSS minimum threshold (OBSS min). In the embodiment shown, an OBSS max value can be −65 dBm and an OBSS min value can be −82 dBm. However, such values are but one embodiment, and should not be construed as limiting. As shown, in the operating region 1382, the lower an OBSS RSSI value, the lower the transmit power of an out-going packet.

Figure 14:
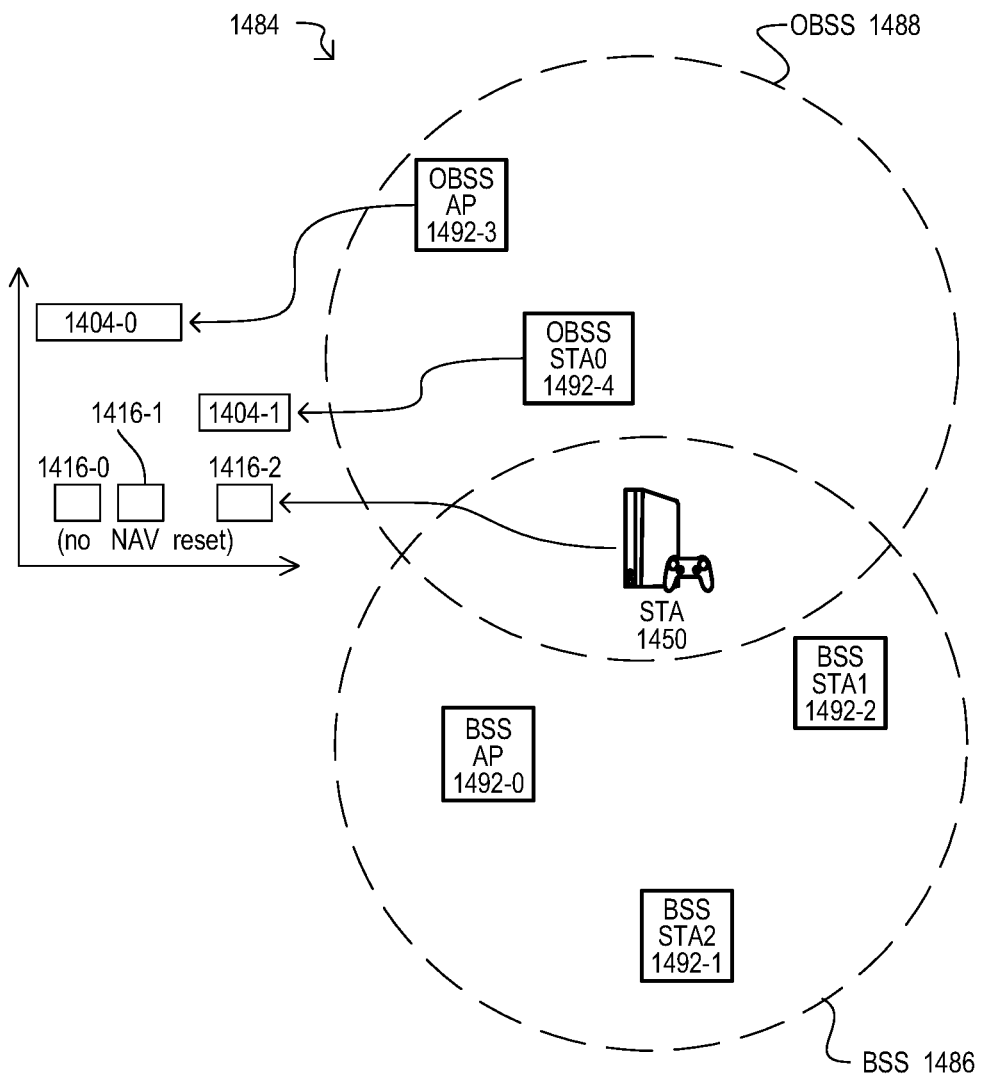
FIG. 14 is a diagram showing a system according to an embodiment.
Figure 16:
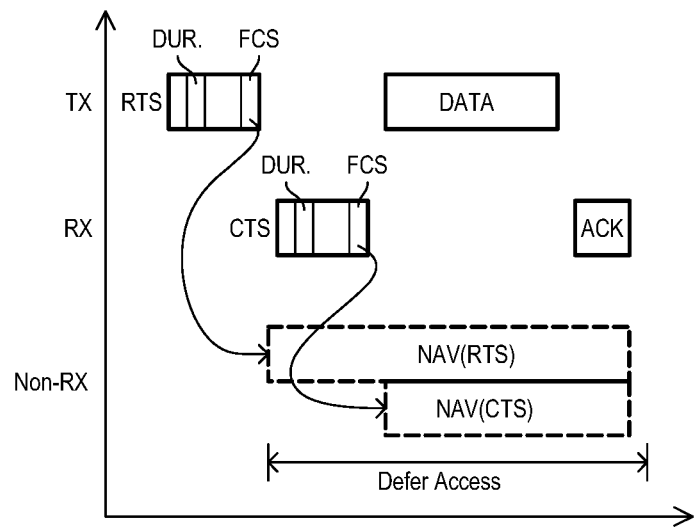
FIG. 16 is a timing diagram showing conventional virtual carrier sense operations according to an embodiment.

FIG. 14 shows a system 1484 according to an embodiment. A system 1484 can include a first network (BSS) 1486 and second network (OBSS) 1488. BSS 1486 can include an access point (AP) 1492-0, STAs 1492-1/2, and a device 1450. Device 1450 can operate according to devices and methods described herein, or equivalents.

OBSS 1488 can include an AP 1492-3 and STA 1492-4. Transmissions from AP 1492-3 and STA 1492-4 can interfere with those of STA 1450, and can be detected by STA 1450.

According to embodiments, device 1450 can transmit out-going packets during transmissions from an OBSS as described herein, or equivalents. In FIG. 14, STA 1450 can detect an OBSS packet 1404-0 from OBSS AP 1492-3, and in response send two out-going packets 1416-0/1 for its own BSS 1486 during the OBSS packet 1404-0. Subsequently, device 1450 can detect OBSS packet 1404-1 from OBSS STA 1492-4, and transmit an outgoing packet 1416-2 during such a packet. A power level of out-going packets 1416-0/1/2 can be adjusted according to a power level of detected OBSS packets as described herein, or equivalents.

Embodiments can reduce the delay in transmissions in environments having interfering transmissions from other networks. At the same time, devices can free up the medium for their own BSS by updating their NAV counters in response to packets from their BSS.

FIG. 15 is a table showing device performance according to an embodiment. FIG. 15 shows the performance of the example of FIG. 17A compared to that of an embodiment, under the same conditions (coding set MSC4, NSS1, BSS AMPDU packet of 300 bytes, and OBSS packet of 1500 bytes). As shown, by operating according to an embodiment, in the presence of the OBSS interference, a device can improve average transmission delay by about 55%. Transmission throughput for the device can be improved by about 125%. At the same time OBSS transmission throughput can be essentially the same.

Embodiments can advantageously improve systems having devices that transmit smaller packets of data, but that benefit from lower latency. As one of many possible examples, gaming devices can benefit from the advantageous low latency transmissions. As another example, Internet-of-things (IoT) type devices may transmit small data packets at relatively low frequency, but in some cases can benefit from reduced delay.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
in a wireless device connected to a first network and configured to transmit over a medium,
while a detected packet is being received:
determining if the detected packet has a network identification value, the network identification value identifying a network in which wireless devices are connected;
when the network identification value of the detected packet matches that of the first network, setting a timer value that prevents transmissions on the medium by the wireless device during the duration of the detected packet; and
when the network identification value of the detected packet does not match that of the first network,
dropping the detected packet before it is fully received and not setting the timer value, and
transmitting an outgoing packet on the medium within the duration of the dropped detected packet; wherein
the duration of the dropped detected packet is determined from a length value in the preamble of the detected packet.

2. The method of claim 1, wherein:
the first network is compatible with an IEEE 802.11 wireless standard,
the network identification value comprises a basic service set identification value (BSSID), and
the timer comprises a network allocation vector (NAV).

3. The method of claim 1, wherein:
while the detected packet is being received, determining a length value of the detected packet from a preamble of the detected packet.

4. The method of claim 3, wherein:
the detected packet is compatible with at least one IEEE 802.11 standard, and
the preamble comprises a legacy signal field (L-SIG) containing the length value.

5. The method of claim 1, further including:
while the detected packet is being received, determining a receive power of the detected packet; and
varying a transmitting power of the outgoing packet in response to the receive power.

6. The method of claim 5, wherein:
varying the transmitting power of the outgoing packet comprises
when the receive power is below a minimum threshold, transmitting at a reference power, and
when the receive power is between a maximum threshold and the minimum threshold, transmitting at a power level less than the reference power.

7. A device, comprising:
storage circuits configured to store a network identification value, the network identification value identifying a wireless network to which the device is connected;
wireless communication circuits configured to, while receiving a detected packet:
determine if the detected packet has a network identification value that matches the stored network identification value,
detect a preamble of the detected packet,
determine a length value of the detected packet from a field of the preamble,
determine a duration of the detected packet from the length value,
when the network identification value of the packet matches the stored network identification value, setting a timer value that inhibits transmissions on a medium by the device during the duration of the detected packet, and
when the packet network identification value does not match the stored network identification value,
drop the detected packet,
not set the timer value, and
transmit an outgoing packet within the duration of the dropped detected packet; and
radio circuits configured to receive the detected packet and transmit outgoing packets on the medium.

8. The device of claim 7, wherein:
the wireless communication circuits are compatible with an IEEE 802.11 wireless standard,
the network identification value comprises a basic service set identification value (BSSID), and
the timer comprises a network allocation vector (NAV).

9. The device of claim 7, wherein:
the detected packet is compatible with at least one IEEE 802.11 standard, and
the field of the preamble comprises a legacy signal field (L-SIG).

10. The device of claim 7, wherein:
the radio circuits are further configured to
while the detected packet is being received, determine a receive power of the detected packet, and transmit an outgoing packet with a transmit power established according to a transmit power value within a duration of the dropped packet; and the communication circuits are further configured to vary the transmit power value in response to the receive power.

11. The device of claim 10, wherein:

the communication circuits are further configured to
compare the receive power to a minimum threshold and a maximum threshold,
set the transmit power to a reference level when the receive power is below the minimum threshold, and
set the transmit power to a reduced level that is less than the reference level when the receive power is between the maximum threshold and the minimum threshold.

12. A system, comprising:

a first wireless device configured to,
while receiving a detected packet:
determine if the detected packet has a network identification value that matches a stored network identification value,
when the packet network identification value matches the stored network identification value, setting a timer value that inhibits transmissions on a medium by the first wireless device during the duration of the detected packet, and
when the network identification value of the detected packet does not match the stored network identification value, dropping the detected packet and not setting the timer value; and
an antenna system configured to receive and transmit packets over at least one wireless medium; and
a second wireless device configured to transmit the detected packet, the second wireless device being part of a second BSS (OBSS), the detected packet including a duration field; wherein the wireless device is compatible with an IEEE 802.11 wireless standard,
the stored network identification value comprises a basic service set identification value (BSSID), and
the timer comprises a network allocation vector (NAV).

13. The system of claim 12, wherein:

the first wireless device is further configured to
determine a length value from a preamble of the detected packet while the detected packet is being received,
determine a duration of the detected packet from the length value, and
transmit an outgoing packet on the same medium as the detected packet within the duration of the detected packet.

14. The system of claim 12, wherein:

the first wireless device is further configured to
determine a receive power from a preamble of the detected packet while the detected packet is being received, and
transmit an outgoing packet on the same medium as the dropped packet within a duration of the dropped packet, the transmit power of the outgoing packet varying in response to the receive power.

15. The system of claim 14, wherein:

the first wireless device is further configured to
compare the receive power to a minimum threshold and a maximum threshold,
set the transmit power to a reference level when the receive power is below the minimum threshold, and
set the transmit power to a reduced level that is less than the reference level when the receive power is between the maximum threshold and the minimum threshold.

* * * * *